Patented June 7, 1932

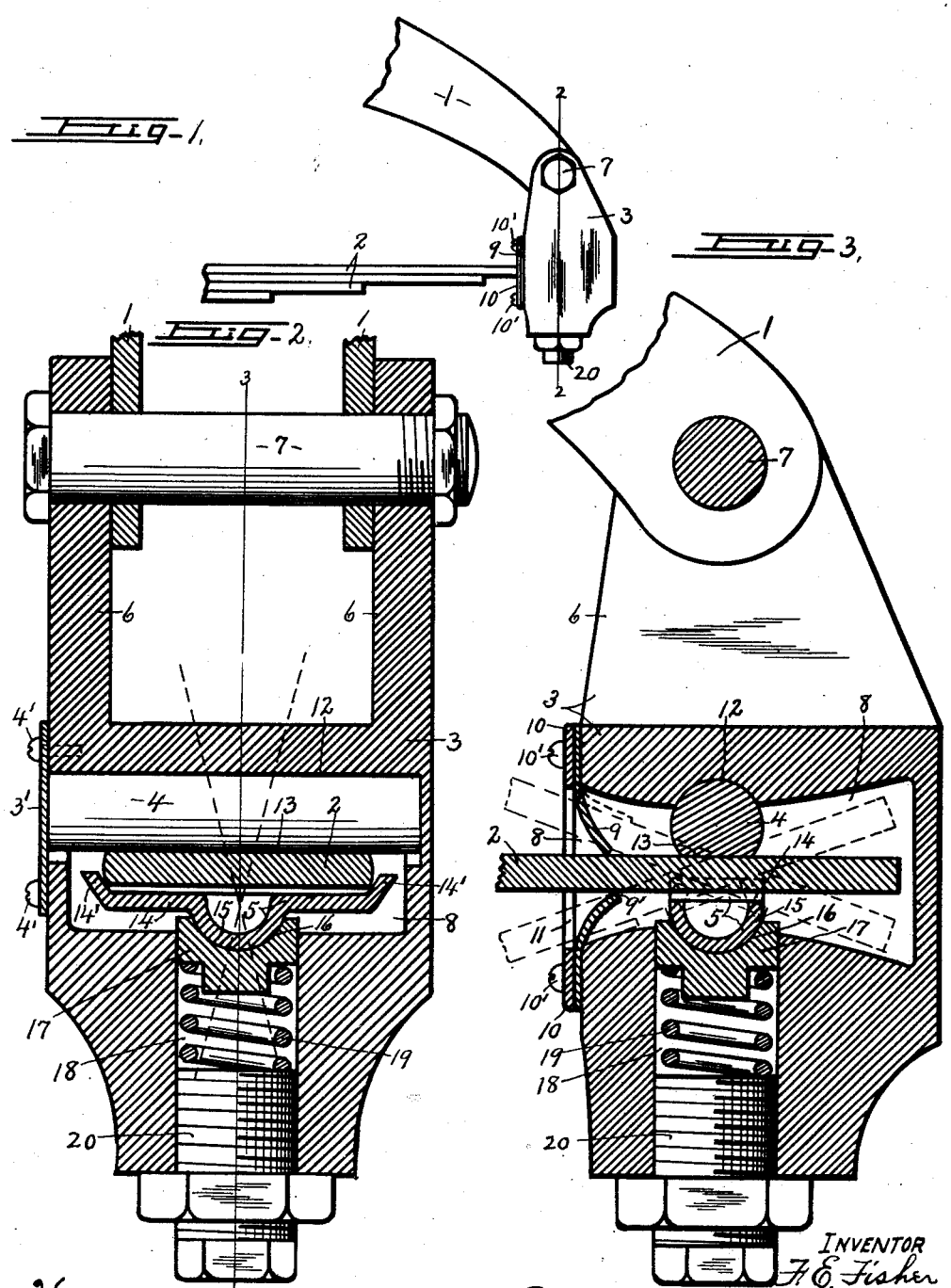

1,861,470

UNITED STATES PATENT OFFICE

FRANK E. FISHER, OF ELMIRA, NEW YORK

SPRING SHACKLE

Application filed July 3, 1931. Serial No. 548,608.

This invention relates to a device for connecting the end of a semi-elliptic or equivalent leaf spring to the chassis frame of an automobile or other motor vehicle, and refers more particularly to the bearings between the spring leaf and hanger or shackle on the frame.

The main object is to provide simple and efficient means for relieving the bearings between the springs and hangers and also between the hangers and chassis frame from excessive strains incidental to the relative weaving action of the frame and springs relatively to each other, particularly when the machine is travelling over uneven road surfaces.

It is, of course, understood that these springs are usually made up of a series of leaves of varying lengths rigidly secured to the axles or to the chassis frame and that under ordinary driving conditions, there is always more or less irregular relative vertical movement of the front and rear axles and opposite ends of each axis, in addition to the irregular vertical movements of the four corners of the body and its supporting frame, all of which irregular movements together with the regular vertical movements of the frame and axles are transmitted to the springs resulting in excessive torsional stresses upon and between the ends of the springs and their supporting shackles or hangers, unless some compensating means is provided to avoid the transverse torsional stresses upon the ends of the springs and adjacent portions of the hangers.

One of the specific objects, therefore, of the present invention is to construct the bearing for the end of each spring leaf in such manner as to permit free relative angular movements of the spring and hanger in all directions without excessive strains upon either of those parts or upon the bearings under widely varying angular movements of the axles and chassis frame relatively to each other.

Other objects and uses relating to specific parts of the device will be brought out in the following description:

In the drawing:

Figure 1 is a side elevation of one end of the chassis frame and corresponding end of a leaf spring showing my improved connections between the spring and frame.

Figure 2 is an enlarged transverse vertical sectional view taken in the plane of line 2—2, Figure 1.

Figure 3 is a vertical sectional view taken in the plane of line 3—3, Figure 2.

In order that the invention may be clearly understood, I have shown one end of a chassis frame —1— and adjacent end of a leaf spring —2— together with a hanger —3— and suitable bearings —4— and —5— carried by the hanger for receiving and supporting the adjacent end of the longer leaf of the spring.

The upper end of the hanger —3— is bifurcated to form opposite arms —6— which are secured to the adjacent end of the frame —1— by means of a bolt —7— which may serve the double purpose of a pivotal connection between the hanger —3— and frame —1—, or may be tightened sufficiently to firmly clamp those parts to each other.

The intermediate portion of the hanger —3— is provided with a lengthwise socket —8— opened at one end (in this instance the forward end) and having its other end closed by an end wall —8'—, the lower and upwards walls of the socket or opening —8— being preferably convexed toward each other and arranged in sufficiently spaced relation vertically to allow free angular movement of the hanger —3— and adjacent end of the spring —2— relatively to each other as may be necessary to compensate for differential movements of the axles and frame upon which the springs and hangers are respectively mounted.

The open end of the socket —8— is mainly closed by a flexible gasket or packing member —9— having a central opening —9'— through which the end of the spring —2— is adapted to extend, said gasket being secured in place by clamp plate —10— and screws —10'— as shown more clearly in Figure 3.

The opening —9'— in the gasket is slightly less than the cross sectional area of the adjacent portion of the spring so that when the latter is inserted endwise into the socket —8— it will deflect the walls of the gasket inwardly so that they will automatically engage the outer surface of the spring to form practically a closed chamber —8— in which grease or other lubricant may be placed for lubricating the bearing members —4— and —5—, it being understood that the opening as —11— in the clamping plate —10— will be of approximately the same area as that of the adjacent end of the socket —8— to allow free play of the end of the spring in the socket.

The bearing member —4— extends transversely across the upper face of the spring —2— and constitutes what may be termed a rocker shaft which is mainly cylindrical in cross section and has its upper side seated in a substantially semi-cylindrical bearing —12— in the upper wall of the socket —8— so as to rock freely about its axis in the recess.

The lower side of the rock shaft —4— is flattened at —13— and the flattened portion is extended at least the full width of the adjacent portion of the spring —2— to contact with the upper surface of said spring and thereby to hold the adjacent portion of the spring in a plane substantially parallel with the axis of the rock shaft while permitting relative movements of the spring —2— and hanger —3— lengthwise and transversely of the axis of the rock shaft while maintaining flat contact between the rock shaft and spring.

In other words, the spring —2— and rock shaft —4— are free to slide one upon the other as the longitudinal angular relation of the spring and chassis frame varies, particularly when the machine is traveling over irregular or uneven road surfaces, resulting in more or less irregular weaving of the frame and running gear of the vehicle, the longitudinal angular movements of the spring being indicated by dotted lines in Figure 3, as one condition of weaving which might exist.

It will also be noted that ample space is left between the end of the spring and adjacent end of the wall of the socket —8— to allow free and endwise play of the end of the spring within the socket to avoid any possibility of buckling and resulting breaking of the spring.

The lower face of the end of the spring —2— is seated upon a supporting member —14— which extends transversely thereof directly under the axis of the rocker shaft —4— parallel therewith and is provided with upwardly diverging flanges —14'— engaging opposite edges of the spring to hold the spring and its supporting member against relative lateral displacement and at the same time to assist in holding the spring flatwise against the flattened lower face —13— of the rocker shaft.

This supporting member —14— is provided with a central pendant boss —15— having a substantially hemi-spherical lower face which is seated in a complementary recess —16— in the upper face of the bearing member —17—.

This bearing member —17— is movable in a vertical opening —18— in the lower wall of the socket —8— and is spring-pressed upwardly by means of a coil spring —19—, the latter having its upper end engaged with the underside of the bearing member —7— and its lower end engaged with the upper face of an adjusting screw —20— which, in turn, is engaged with an internal threaded lower end of the opening —18—. This adjusting screw —20— serves as a means for compressing the spring —19— so that the latter may serve to yieldingly hold the member —18— in engagement with the boss —15— and also to yieldingly hold the member —14— in engagement with the spring —2—, thereby yieldingly holding the spring against the flattened lower face of the rocker shaft —4—, the object being to take up wear and to reduce the liability of noise incidental to lost motion.

It is now clear that the rock shaft —4— is supported directly upon the spring —2— thereby carrying the weight of the hanger —3— and adjacent overlying portion of the frame —1—, for transmitting the load of the body of the vehicle to the axle through the medium of the springs —2— which are usually mounted upon or operatively connected to the axles of the vehicle.

The member —14— constitutes what may be termed a saddle which together with the bearing member —17—, spring —19—, and adjusting screw —20—, serve to connect the spring and hanger in such manner as to resist upward thrust or rebound of the frame and body of the vehicle due to the interposition of the spring —19— between the hanger —3— and saddle —14— thereby utilizing the coil spring —19— as a partial shock absorber.

It is now clear that the contact between the lower side of the rocker shaft —4— and upper face of the spring —2— is maintained mainly by the weight of the frame —1— and body of the vehicle and that any reasonable variation in the angle between the frame and spring is permitted by the angular movement of the rocker shaft —4— in its bearing —12— while relative transverse movements between the spring —2— and hanger —3— are permitted partially by the rocking movement of the boss —15— in its bearing —16— about the center of the spherical bearing surfaces between the parts —15— and —16—, the transverse angular movements being indicated by dotted lines in Figure 2.

In order to prevent endwise displacement of the rocker shaft —4—, one of the end walls of the bearing —12— may be permanently closed by a part of the hanger —3— while the other end may be closed by releasable means such as a cap plate —3'— held in place by screws —4'— as shown in Figure 2. When the vehicle is in motion over more or less uneven road surfaces the end of the spring —2— is free to slide transversely across and against the flat surface —13— of the rocker shaft —4— to compensate for relative vertical movements of the frame and running gear of the vehicle while at the same time any variation in the longitudinal angular relation between the spring and the hanger —3— will cause the rock shaft —4— to rock in its bearing —12— as indicated by dotted lines in Figure 3, it being understood that this relative angular movement between the spring and hanger will be transmitted to the rocking member or saddle —14— by reason of the ability of the latter to rock in its hemispherical bearing —16—, whether the angular movement is longitudinal or transverse relatively to the spring —2—.

The operation of the invention has been fully described in the foregoing description and while the construction shown is particularly simple and efficient for carrying out the objects of the invention, it will be obvious that certain details of such construction may be modified without departing from the spirit of the invention.

What I claim is:—

1. A device for connecting the end of a leaf spring to the chassis frame of a vehicle, comprising a hanger secured to the frame and provided with a lengthwise socket into which the end of the leaf-spring extends, the upper wall of the socket having a transversely extending semi-cylindrical bearing, a rockshaft journaled in said bearing and having its lower side flattened and engaged with the upper flat face of the adjacent end of the spring to cause said shaft to rock about its axis as the longitudinal angular relation between the frame and spring varies, a bearing member in the lower wall of said socket having a hemi-spherical recess in its upper side, and a supporting member for the end of the spring having a convex hemi-spherical boss seated in said recess to permit relative angular movement of the hanger and spring in all directions while the flat side of rock-shaft and spring maintain flat contact with each other.

2. An end connection for vehicle springs as in claim 1 in which the center of oscillation of the hemi-spherical boss is disposed in the vertical plane of the axis of the rock-shaft.

3. An end connection for vehicle springs as in claim 1 in which the upper side of the spring-supporting member is provided with flanges engaging opposite edges of the adjacent portion of the spring to hold the spring and its supporting member against relative lateral displacement.

In witness whereof I have hereunto set my hand this 27th day of June, 1931.

FRANK E. FISHER.